United States Patent [19]

Nishijima et al.

[11] Patent Number: 5,461,530
[45] Date of Patent: Oct. 24, 1995

[54] MAGNETIC TAPE CASSETTE HAVING A ROCKING GUARD PANEL

[75] Inventors: Kazuyuki Nishijima; Shigeru Nishiyama, both of Kanagawa, Japan

[73] Assignee: Fuji Photo Film Co., Ltd., Kanagawa, Japan

[21] Appl. No.: 22,279

[22] Filed: Feb. 25, 1993

[30] Foreign Application Priority Data

Feb. 28, 1992 [JP] Japan .................. 4-18204 U

[51] Int. Cl.⁶ .................................................. G11B 23/087
[52] U.S. Cl. ........................................ 360/132; 242/347.1
[58] Field of Search ................................ 360/96.5, 96.6, 360/132; 242/198, 347.1

[56] References Cited

U.S. PATENT DOCUMENTS

| | | | |
|---|---|---|---|
| 4,449,677 | 5/1984 | Ohta et al. | 360/132 |
| 4,744,530 | 5/1988 | Cybulski et al. | 242/198 |
| 4,928,197 | 5/1990 | Park et al. | 360/132 |
| 5,011,096 | 4/1991 | Nagai et al. | 360/132 |

FOREIGN PATENT DOCUMENTS

| | | |
|---|---|---|
| 0142897 | 5/1985 | European Pat. Off. . |
| 0260023 | 3/1988 | European Pat. Off. . |
| 8800894 | 4/1988 | Germany . |
| 60-175271 | 9/1985 | Japan ................ 360/132 |
| 62-287491 | 12/1987 | Japan ................ 360/132 |
| 63-52387 | 3/1988 | Japan ................ 360/132 |
| 63-234479 | 9/1988 | Japan ................ 360/132 |

Primary Examiner—Stuart S. Levy
Assistant Examiner—Jefferson Evans
Attorney, Agent, or Firm—Sughrue, Mion, Zinn, Macpeak & SeaS

[57] ABSTRACT

A magnetic tape cassette in which a mechanism for engaging a guard panel with a lower cassette half is simplified, the assembly process thereof is highly efficient, and the cassette is produced inexpensively and with excellent productivity. The magnetic tape cassette is constructed such that an engagement hole is formed on the inner surface of a side wall of a guard panel, and an engagement piece is formed on a side of the casette case and defined by a U-shaped slit so as to flex about a proximal end in the left and right directions relative to the cassette case. A locked state releasing projection and an engagement projection extend from the engagement piece. The engagement projection is engaged with the engagement hole when the guard is closed. The locked state releasing projection extends beyond the side wall of the guard panel and is used for releasing the engagement projection from the engagement hole. In another embodiment, the engagement projection is formed on a side wall of the cassette case, without the U-shaped slit, for engagement with the engagement hole. The engagement projection is removed from the engagement hole with a shift rod of a conventional tape deck.

3 Claims, 2 Drawing Sheets

MAGNETIC TAPE CASSETTE HAVING A ROCKING GUARD PANEL

BACKGROUND OF THE INVENTION

The present invention relates generally to a magnetic tape cassette. More particularly, the present invention relates to a magnetic tape cassette of the type including a pair of rotatably supported tape winding members and a rotatable guard panel for opening or closing a front portion of the tape cassette.

A number of different types of magnetic tape cassettes are presently in use, each including a cassette case in which a magnetic tape is wound around a pair of hubs rotatably supported to enable recording and reproducing.

Each magnetic tape cassette of the foregoing type is constructed such that a pair of tape winding members, having a magnetic tape wound therearound and extending therebetween, are rotatably supported in a cassette case composed of upper and lower cassette halves each molded from a synthetic resin such as, for example, acrylonitrile-butadiene-strylene copolymer.

A VHS type magnetic tape cassette is one example of a typical magnetic tape cassette in which a magnetic tape is received in a cassette case and drawn through a front opening portion of the cassette case to enable recording and reproducing. As is well known, the foregoing type of magnetic tape cassette is provided with a turnable guard panel adapted to open and close the front opening portion not only for the purpose of preventing dust from entering the tape cassette but also for protecting the magnetic tape from being torn or physically damaged resulting in a malfunction.

FIG. 4 is a fragmentary perspective view of a conventional VHS type video tape recording magnetic tape cassette, particularly showing a rotational support shaft for a guard panel and part of a lock plate.

As is well known, the guard panel 10 shown in FIG. 4 is designed in a substantially U-shaped configuration to close a front opening portion of the tape cassette and includes a front wall (not shown), side walls (only one shown in the drawing) 11 standing upright at the opposite ends of the front wall and an upper surface wall (not shown). A rotational support shaft 13 bridged between the opposite side walls 11 of the guard panel 10 is rotatably supported within a shaft bearing hole 15 of a side wall 14 of the cassette case. As the rotational support shaft 13 rotates about its center axis 16, the cassette opening portion is opened or closed.

The guard panel 10 is immovably held by a lock plate 17 which is arranged inside of the side wall 14 on the front side of the cassette case. With this construction, an engagement projection 19 extending from a plate portion 18 of the lock plate 17 engages a recess formed on the side wall 11 after it passes through the side wall 14. On the other hand, a disengagement projection 20 extends from the plate portion 18 so that it is exposed to the rear side of the tape cassette relative to the side wall 11. Thus, the engagement projection 19 is released from the engaged state by thrusting the disengagement projection 20 with a releasing member of a recording/reproducing unit or the like.

A rotational shaft 26 of the lock plate 17 is adapted to rotate about a longitudinally extending center axis 27, and a biasing force effective in the locking direction is applied by a lock plate spring 28 spirally wound about the rotational shaft 26. One end of the lock plate spring 28 is engaged with the plate portion 18, while the other end is engaged with the tape cassette. With this construction, when the lock plate 17 is fitted to the tape cassette, the lock plate spring 28 must be moved to a predetermined location so that the fitting operation is not obstructed by the lock plate spring 28. For this reason, the fitting operation is unavoidably complicated and difficult.

SUMMARY OF THE INVENTION

The present invention has been made in consideration of the above described drawbacks, and its object resides in providing a magnetic tape cassette in which a mechanism for placing a guard panel in the engaged state and a mechanism for releasing the same from the engaged state can be simplified without using a lock plate of the aforementioned type, and, moreover, wherein the magnetic tape cassette can be assembled with high operational efficiency.

According to one aspect of the present invention, the magnetic tape cassette includes a pair of tape winding members having a magnetic tape wound therearound and extending therebetween, the members being rotatably received in a cassette case including upper and lower cassette halves, a turnable guard panel adapted to open and close an opening portion of the cassette for enabling the magnetic tape to be displaced in the forward direction for reading, recording or erasing, and locking means for locking the turning movement of the guard panel by engagement with a side wall of the tape cassette. Specifically, the magnetic tape cassette includes an engagement hole formed on the inner surface of a side wall of the guard panel at the lower part of the same. An engagement piece, adapted to turn in the left and right directions relative to the tape cassette, is molded integrally with a lower cassette half at the lower part of the same, while one of the opposite ends of the engagement piece as observed in the longitudinal direction serves as a hinge portion wherein an engagement projection to be engaged with the engagement hole and an unlocking projection adapted to extend beyond the surface of the side wall of the guard panel are formed on the engagement piece.

In addition, according to another aspect of the present invention, the magnetic tape cassette includes a pair of tape winding members having a magnetic tape wound therearound and extending therebetween, the members being rotatably received in a cassette case including upper and lower cassette halves, a turnable guide panel adapted to open or close an opening portion thereby enabling the magnetic tape to be displaced in the forward direction for reading, recording or erasing, and locking means for locking the turning movement of the guard panel by bringing it in engagement with a side wall of the tape cassette. Specifically, the magnetic tape cassette includes an engagement hole formed on the inner surface of a side wall of the guard panel at the lower part of the same, and an engagement projection to be engaged with the engagement hole, the engagement projection being formed on the outer surface of a side wall of the cassette half, whereby the guard panel is locked by engagement of the engagement projection within the engagement hole.

DESCRIPTION OF THE PREFERRED EMBODIMENTS

The present invention will be described in detail hereinafter with reference to the accompanying drawings, which illustrate preferred embodiments thereof.

Figure 1:
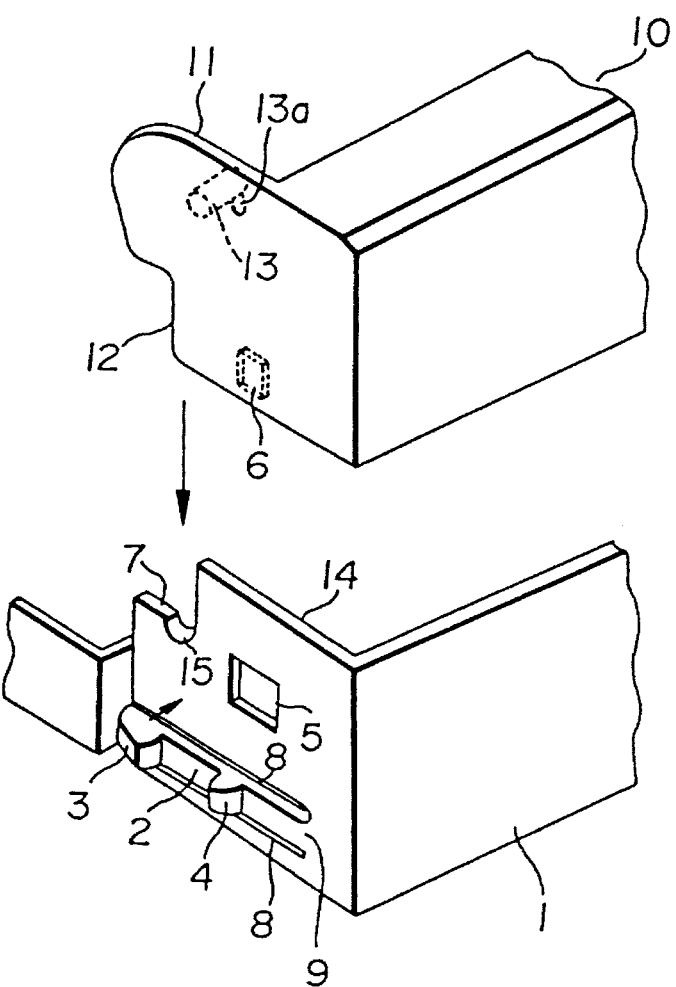
FIG. 1 is a fragmentary perspective view of a magnetic tape cassette in accordance with an embodiment of the present invention, particularly showing the structure of a side wall portion of the magnetic tape cassette.
Figure 2:
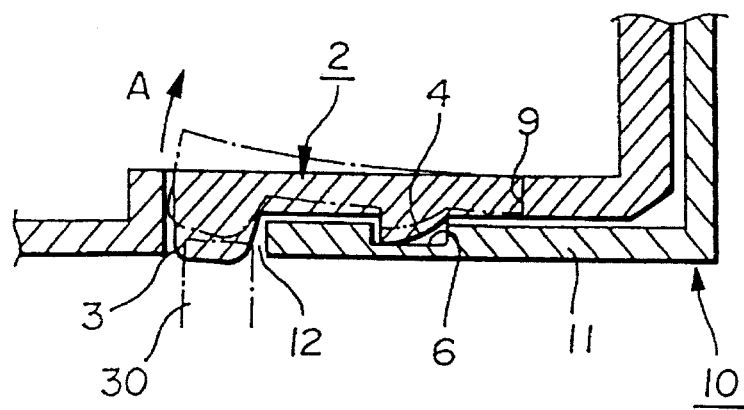
FIG. 2 is an enlarged fragmentary sectional view of the magnetic tape cassette, particularly showing an engagement piece molded integrally with a guard panel.

FIG. 1 is a fragmentary perspective view of a VHS type magnetic tape cassette in accordance with an embodiment of the present invention, particularly illustrating a front side wall portion of a lower cassette half and a part of a guard panel, and FIG. 2 is a fragmentary sectional plan view of the magnetic cassette, particularly illustrating engagement of the side wall portion of the lower cassette half with a side wall portion of the guard panel as well as disengagement of the former from the latter.

The guard panel, designated by reference numeral 10, is resiliently biased in the closing direction by a spring (not shown) for the guard panel mounted about a rotational support shaft 13. One end of the spring is engaged with a projection 13a radially extending from the support shaft 13 and the other end of the same is engaged with an upper cassette half (not shown) Df the tape cassette so that the foregoing resilient biasing force is generated by the spring.

Referring to FIG. 1, the support shaft 13 extends inwardly from a side wall 11 of the guard panel 10, and an engagement hole 6 is formed on the side wall 11 at a position in the vicinity of the lower end of the side wall 11. In addition, a cutout portion 12 is formed in the region below the left-hand part of the side wall 11 including the support shaft 13. The lower cassette half 1 includes two parallel slits 8 at the lower part of a side wall 14 of the tape cassette, which slits 8 form an engagement piece 2 adapted to pivot about a hinge portion 9 in the left and right directions relative to the tape cassette. A locked state releasing projection 3 and an engagement projection 4 extend outwardly from the engagement piece 2. As is best seen in FIG. 2, the locked state releasing projection 3 is located at a position corresponding to the cutout portion 12 of the side wall 11 and extends beyond the surface of the side wall 11 of the lower cassette half 1, and the engagement projection 4 is located between the locked state releasing projection 3 and the hinge portion 9.

Referring to FIG. 1 again, a stepped part 7 is formed behind the side wall 14, and a bearing hole 15 for holding the rotational shaft 13 is formed on the stepped part 7. In addition, an aperture 5 for a tape end detecting sensor (not shown) is formed through the side wall 14 at a position located rearwardly from the bearing hole 15 and above the engagement projection 4. When an upper cassette half (not shown) is placed on the lower cassette half 1 together with the guard panel 10, the rotational shaft 13 is received in the bearing hole 15 so as to allow the panel 10 to freely rotate about the bearing hole 15 on the rotational shaft 13. At this time, the engagement projection 4 on the engagement piece 2 is brought into engagement with the engagement hole 6 on the side wall 11 of the guard panel 10 so that the guard panel 10 is held in such an operative state that the front surface of the magnetic tape cassette is normally covered with the panel 10 to prevent the magnetic tape from being damaged.

While the guard panel 10 is closed as shown in FIG. 2, the engagement projection 4 is received in the engagement hole 6 to prevent the guard panel 10 from being turnably opened. When the magnetic tape cassette is inserted into the recording/reproducing unit, the locked state releasing projection 3 is thrust by an unlocking member 30 disposed at a predetermined location in the recording/reproducing unit. As a result, the engagement piece 2 is deformed in the, inward direction (i.e., in the direction indicated by arrow "A" in FIG. 2), whereby the engagement projection 4 is disengaged from the engagement hole 6. Thus, the guard panel 10 is released from the locked state, whereby it can be opened.

As described above, in this embodiment, the magnetic tape cassette is constructed such that the engagement piece 2 including the locked state releasing projection 3 and the engagement projection 4 is formed on the side wall 14 of the lower cassette half 1. Thus, the cassette can be produced merely by changing an injection molding die for molding the lower cassette half 1 without the necessity of arranging complicated mechanisms employed for a conventional injection molding die. Consequently, a number of magnetic tape cassettes can be produced successively (i.e., on a production line), as well as inexpensively and with excellent productivity. Moreover, the conventional lock plate is unnecessary, and the cassette of the present invention operates much more simply.

Figure 3:
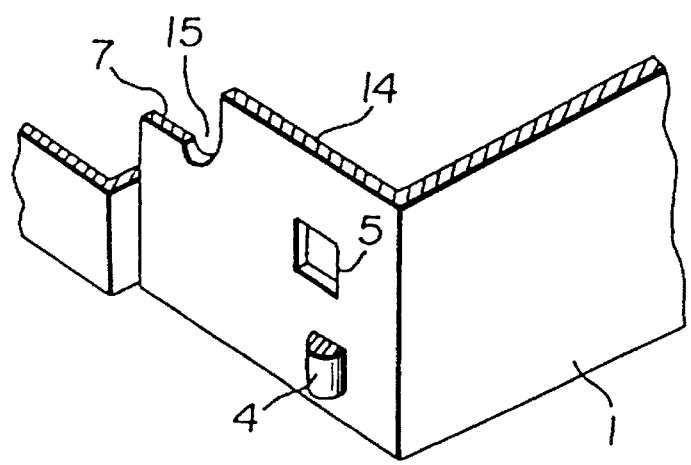
FIG. 3 is a fragmentary perspective view of a magnetic tape cassette in accordance with another embodiment of the present invention, particularly showing the structure of a side wall portion of a lower cassette half.
Figure 4:
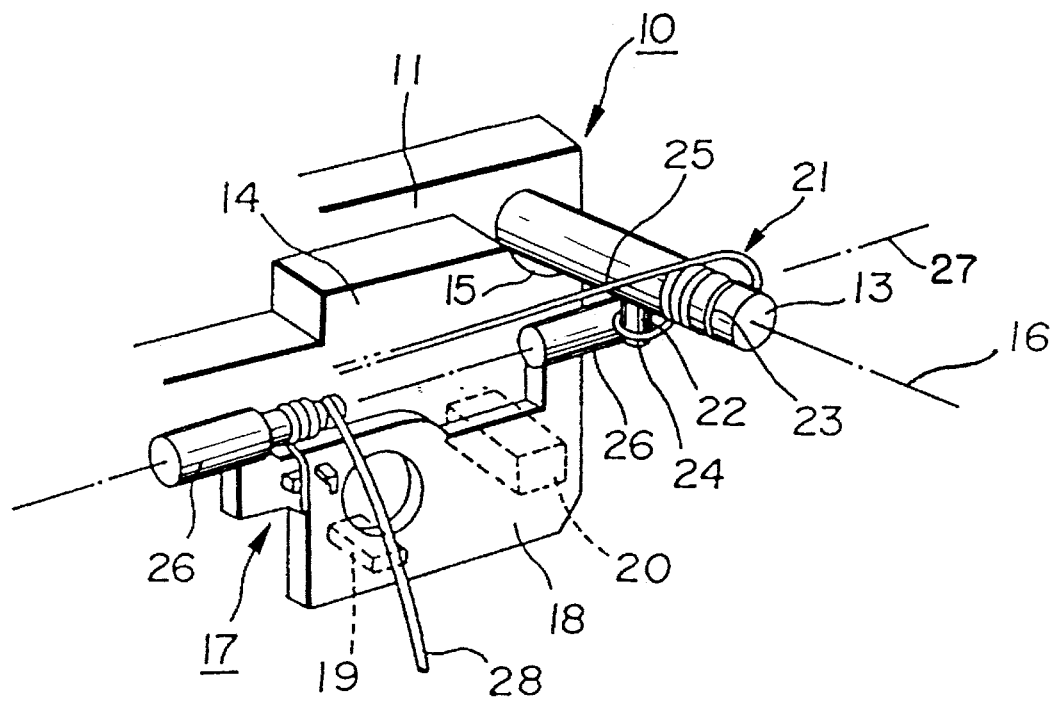
FIG. 4 is an enlarged fragmentary perspective view of a conventional magnetic tape cassette, particularly showing the arrangement of essential components for the magnetic tape cassette.

FIG. 3 is a fragmentary perspective view of a magnetic tape cassette in accordance with another embodiment of the present invention. An illustration of a guard panel 10 is omitted for the purpose of simplification of the figure, and only a lower cassette half 1 is shown. In this embodiment, an aperture 5 is likewise formed through a side wall 14 of the lower cassette half 1 to allow a light beam emitted from a tape end detecting sensor (not shown) to pass therethrough, and an engagement projection 4 is molded integrally with the side wall 14 at a position below the aperture 5. The guard panel 10 (not shown) is constructed in the same manner as the preceding embodiment. Specifically, an engagement hole 6 is formed on the inner surface of a side wall of the guard panel 10 so that the engagement projection 4 is engaged with the engagement hole 6 with a predetermined mechanical strength. When a tape cassette is stored in the inoperative state, the engagement projection 4 is forcibly fitted into the engagement hole 6. On the contrary, when the tape cassette is being used, a bucket having the tape cassette held therein is displaced in the downward direction, and a shift rod (not shown) in a deck is engaged with the guard panel 10 at a certain location in the course of the downward displacement of the bucket, causing the guard panel 10 to be turned in the upward direction against the mechanical engaging force between the engagement hole 6 and the engagement projection 4.

The magnetic tape cassette of this embodiment can be constructed more simply than the preceding embodiment shown in FIG. 1. That is, the engagement projection 4 is formed integrally with the side wall 14 of the lower cassette half 1, and the projection 4 can be disengaged from the hole 6 by turnably raising the guard panel 10 against the mechanical engaging force with the aid of the shift rod (not shown) in a tape deck. Since the magnetic tape cassette is constructed more simply than the cassette shown in FIG. 1, it can be produced with excellent productivity.

As is apparent from the above description, according to the present invention, a magnetic tape cassette is constructed such that an engagement hole is formed on the inner surface of a side wall of a guard panel at the lower part of the same, and an engagement piece adapted to turn in the left and right directions relative to the tape cassette is formed integrally with a side wall of a lower cassette half at the lower part of the same. One of the opposite ends of the engagement piece, as observed in the longitudinal direction, serves as a hinge portion, and an engagement projection adapted to be engaged with the engagement hole and a locked state releasing projection adapted to extend outside of the surface of the side wall of the guard panel are formed on the engagement piece. In another embodiment, the magnetic tape cassette is constructed such that an engagement hole is formed on the inner surface of a side wall of a guard panel at the lower part of the same, and an engagement projection adapted to be engaged with the engagement hole is formed on the outer surface of a side wall of a lower cassette half at the lower part of the same, whereby the guard panel is locked by engagement of the engagement projection with the engagement hole.

Since the present invention does not employ a lock plate as in the conventional magnetic tape cassette, the cassette of the present invention can be assembled much more simply and efficiently, and the mechanism for holding the guard panel in the engaged state as well as the mechanism for releasing the guard panel from the engaged state are simplified. Consequently, the magnetic tape cassette of the present invention can be assembled inexpensively and with high operational efficiency.

What is claimed is:

1. A magnetic tape cassette comprising:
   a cassette case comprising upper and lower cassette halves;
   a pair of tape winding members rotatably supported within said cassette case;
   a magnetic tape wound around and between said tape winding members;
   a turnable guard panel rotatably covering an opening portion in a front wall of said cassette case through which said magnetic tape is forwardly displaced for reading, recording or erasing; and
   locking means for locking said guard panel by bringing said guard panel into engagement with a side wall of said cassette case, said locking means comprising:
   an engagement piece defined by a U-shaped slit formed in a lower portion of the side wall of the lower cassette half of said cassette case, said engagement piece being flexible about a proximal end thereof relative to the side wall of said cassette case and extending away from said front wall, said proximal end being proximate to said front wall, a rotational axis of the guard panel is positioned above and to the rear of the proximal end;
   an engagement portion projecting outwardly from said engagement piece for engagement with an engagement hole formed along an inner side wall of said guard panel; and
   a locked state releasing projection projecting outwardly from said engagement piece beyond said side wall of said guard panel for receiving a force for flexing said engagement piece to release said engagement portion from said engagement hole, wherein
   said engagement portion and said locked state releasing projection are integrally formed with said engagement piece,
   said locked state releasing projection is positioned at a distal end of said projection piece,
   said engagement portion is positioned between said distal end and said proximal end of said projection piece, and
   said engagement portion and said proximal end are covered with a side wade of said guard panel when said guard panel covers the opening portion, whereas the locked state releasing projection remains exposed when said side wall of said guard panel covers said engagement portion and said proximal end.

2. A magnetic tape cassette as recited in claim 5, wherein the side wall of said guard panel includes a stepped portion, and wherein said locking state releasing projection extends adjacent said stepped portion beyond the side wall of said guard panel.

3. A magnetic tape cassette as claimed in claim 1, wherein the engagement hole is formed in a lower inner side wall of said guard panel at a position corresponding to said engagement projection on said engagement piece.

* * * * *